United States Patent [19]
Gerster

[11] Patent Number: 5,927,658
[45] Date of Patent: Jul. 27, 1999

[54] WIRE TRELLIS TRAY FOR CABLES AND ELECTRICAL CONDUCTORS

[75] Inventor: Max Gerster, Winkel, Switzerland

[73] Assignee: Zurecon AG, Zurich, Switzerland

[21] Appl. No.: 09/001,539

[22] Filed: Dec. 31, 1997

[51] Int. Cl.[6] ...................................... F16L 3/00
[52] U.S. Cl. .......................... 248/49; 211/126.8; 206/507
[58] Field of Search .............................. 248/49; 206/507, 206/513, 821; 211/126.8; 220/485, 491

[56] References Cited

U.S. PATENT DOCUMENTS

| | | | |
|---|---|---|---|
| 2,822,951 | 2/1958 | Case | 206/513 |
| 2,950,825 | 8/1960 | Averill | 211/126.8 |
| 3,149,748 | 9/1964 | Hare et al. | 206/513 |
| 3,887,073 | 6/1975 | Wilson | 206/507 |

FOREIGN PATENT DOCUMENTS

| | | |
|---|---|---|
| 0 191 667 | 8/1986 | European Pat. Off. . |
| 0298825 | 1/1989 | European Pat. Off. . |
| 2590736 | 5/1987 | France . |
| 2 599 906 | 12/1987 | France . |
| 2 613 146 | 9/1988 | France . |
| 634 178 | 1/1983 | Switzerland . |

Primary Examiner—Ramon O. Ramirez
Assistant Examiner—Robert Lipcsik
Attorney, Agent, or Firm—Browdy and Neimark

[57] ABSTRACT

Wire trellis cable trays (10, 10') made of cross wires (1) and longitudinal wires (2) connecting the former are to be made stackable so that they can be stored and transported in practical groups in a space-saving manner. For this purpose, the side legs (3) of the U-shaped cross wires (1) are crimped toward the outside at a certain height, resulting in a proportional widening of an upper portion of the tray cross-section. The stackability (with the cross wires being slightly offset in a longitudinal direction) is thus attained.

8 Claims, 1 Drawing Sheet

5,927,658

WIRE TRELLIS TRAY FOR CABLES AND ELECTRICAL CONDUCTORS

FIELD OF THE INVENTION

The present invention relates to a wire trellis tray for cables and electrical conductors, having cross wires bent essentially into a U-shape determining the cross-section of the trays, and longitudinal wires along the outside, connecting the cross wires.

REVIEW OF RELATED TECHNOLOGY

Wire trellis cable trays of this type are widely used in electrical installations. This type of tray has the advantage that it can be produced cost effectively and provides very good ventilation of the installed cables and electrical conductors. However, a significant shortcoming still remains in that the tray sections take up a large amount of space during storage and transportation, offsetting, to a great extent, the savings of cost-effective production.

With known cable trays made of U-shaped sheet steel and used for similar applications, this can easily be remedied by slightly slanting the sidewalls (at an obtuse angle to the bottom), so that the empty trays can be stacked inside each other (Swiss Patent CH-634 178). An analogous measure is not feasible for wire trellis cable trays, however, as the total thickness of the crossed trellis wires amounts to a multiple of the usual wall thickness of cable trays made of sheet steel.

Several recommendations have been published on how wire trellis cable trays can be stored and transported in a space-saving manner as well. These suggestions primarily consist of manufacturing one or both sidewalls separately from the bottom and designing the parts so that they are either connected along a longitudinal line by a joint, or assembled from interlocking pieces to form the tray profile (FR-A-2 599 906, FR-A-2 613 146, EP-A-0 191 667). This, however, makes it considerably more expensive to manufacture the parts, and handling/installation accordingly become complex and more expensive as well.

OBJECTS AND SUMMARY OF THE INVENTION

It is the aim of the present invention to eliminate the above-described shortcomings of known designs of wire trellis cable trays. Specifically, the volume required for storage and transportation of wire trellis cable trays is to be reduced significantly, however, without resulting in significant added manufacturing costs or more complicated handling of the product during installation.

This aim is met according to the invention with the side legs of the cross wires being crimped toward the outside by an amount at least equal to the total thickness of the crossed longitudinal and cross wires, thus resulting in a step-like widening of the tray cross-section in an upper partial area of the tray, so that wire trellis trays of equal width whose cross wires are offset in the longitudinal direction can be stacked inside each other.

With such a relatively simple modification of the design, the wire trellis cable trays can now be stacked in groups to form manageable "packages" which can be stored and transported with drastically reduced space requirements (up to 70% reduction in volume). The crimping of the cross wires results in only a minimal added expenditure and is preferably done after the wire trellises have already been welded. For transportation purposes and at the construction site, the stacking offers the added advantage that the individual trays have a significantly reduced tendency to get entangled and also support each other inside the stack, preventing the trays from getting bent. None of these measures in any way affects the good performance of the trays for the user.

BRIEF DESCRIPTION OF THE DRAWINGS FIGURES

The invention is described in detail below based on an exemplary embodiment in connection with the appended drawing. All figures show a lower tray section indicated by solid lines and an additional identical tray section above the lower one, indicated by dashed lines.

DETAILED DESCRIPTION OF THE PREFERRED EMBODIMENT

Figure 1:
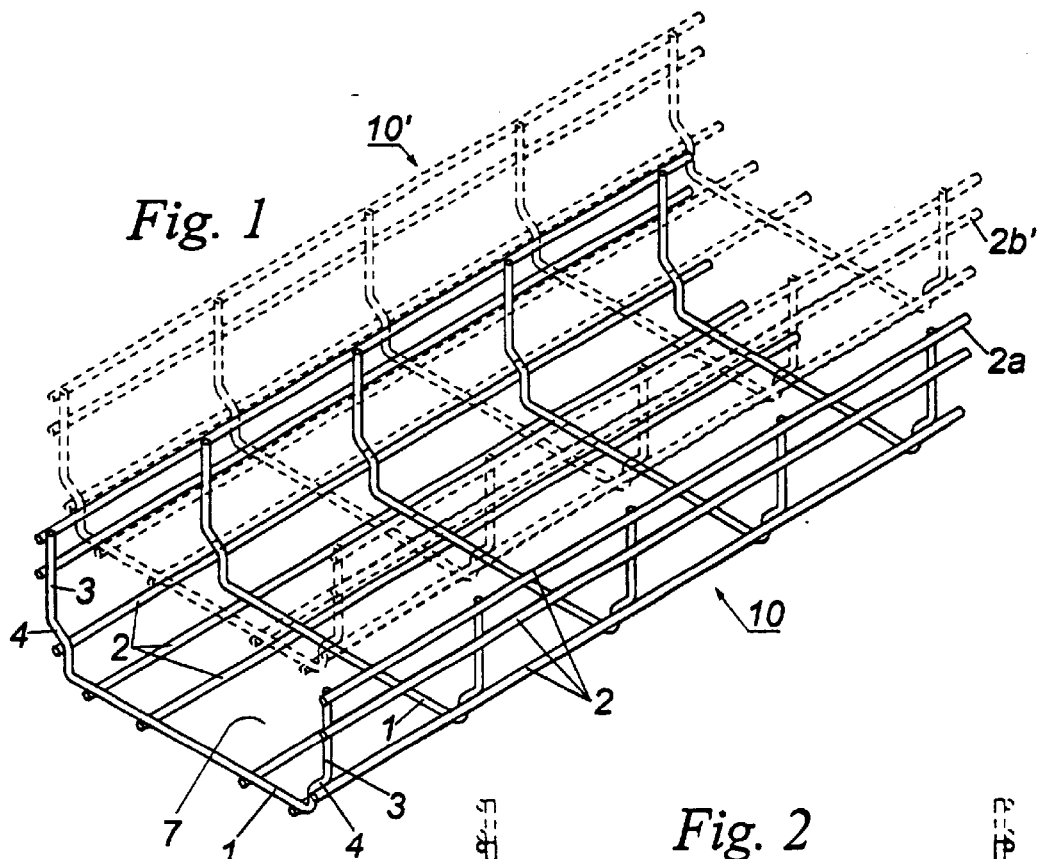
FIG. 1 shows two identical wire trellis cable tray sections in the perspective, arranged above each other but not yet stacked inside each other.

The illustrated wire trellis cable trays 10, 10' are made of the usual approximately U-shaped cross wires 1 determining the tray cross-section, and longitudinal wires 2, arranged parallel to each other and connecting the cross wires on the outside of the frame. These trays are usually manufactured by first welding flat trellises from straight wires and then beveling sections of a suitable length (e.g., 3 m) to form the side legs 3 of the cross wires, or the sidewalls of the tray 10, respectively. The wire may be 4 mm steel wire, for example, either of stainless quality or with galvanization or plastic-coating of the welded trellises.

As shown in the drawings, the side legs 3 of the cross wires are then provided with a crimping 4, i.e., are bent twice, resulting in a proportionally widened upper cross-section of the tray. The amount a of the crimping (FIG. 2) corresponds to at least the total thickness of the crossed wires 1 and 2 (i.e., the sum of their diameters). As a result, two or more wire trellis cable trays 10, 10' can easily be stacked vertically inside each other, whereby the equally spaced cross wires 1, 1' come to rest next to each other, i.e., they are somewhat offset in the longitudinal direction (FIG. 4). The significant space savings achieved by grouping the trays in stacks are particularly apparent from FIG. 2 and 3. It is also advantageous that the stacked trays all face in the same direction and do not have to be turned and rotated during their removal from the stack.

With respect to the volume reduction attainable through stacking of the trays, the height of the upper cross-section with its step-like widening advantageously corresponds to at least half the total height of the tray cross-section. As regards the location of the longitudinal wires along the side, the longitudinal wire $2a$ connecting the upper ends of the cross wires 1 of the respective lower tray 10 will be placed advantageously at a height so that it forms the support for an intermediate longitudinal wire $2b'$ above the crimping 4 of the respective stacked upper tray 10'. This type of support provides for an unimpeded unstacking of the trays and is considered more practical than the case where a longitudinal wire $2c'$ located below the crimping 4 of the respective upper tray 10' were to come to rest on the slanted crimping of the lower tray 10, which could result in trays getting jammed under the weight of several stacked trays.

Figure 2:
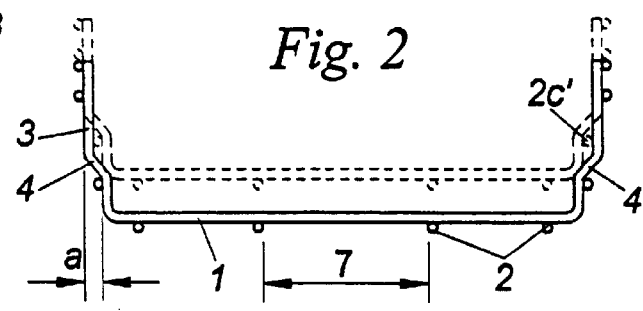
FIG. 2 is a frontal view of the two tray sections according to FIG. 1, now stacked.
Figure 3:
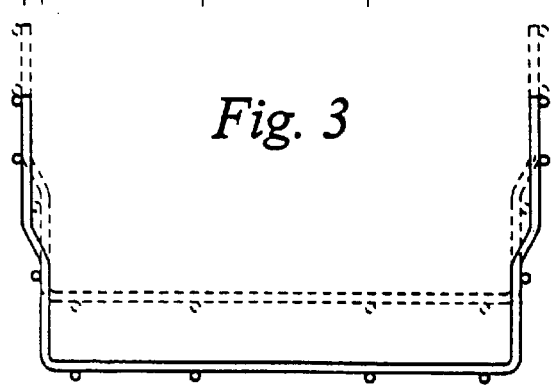
FIG. 3 is the analogous frontal view of two stacked tray sections with higher sidewalls.
Figure 4:
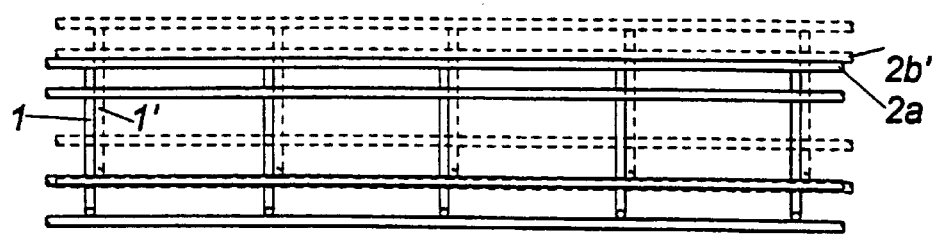
FIG. 4 is a side view of the tray arrangement according to FIG. 2.

From FIG. 2 and 3 it is apparent that wire trellis cable trays of equal width can be stacked even if they have different heights (although this will not be of significant relevance in practice.)

It should also be mentioned that the crimping according to the invention of the cross wire side legs can be used to make stackable not only straight sections of wire trellis cable trays, but also so-called form pieces (not shown in the drawings), e.g., 90° or 45° bends or T-sections (branch connections) which may be inserted between straight sections.

Lastly, as shown in FIG. 1, 2 and 3, the longitudinal wires 2 on the tray bottom are advantageously placed so that a longitudinal center area 7 remains free of wires, i.e., there is no longitudinal wire 2 in the center of the bottom. This is advantageous for a symmetrical "hanging" installation of the wire trellis cable trays, in which vertical brackets (not shown in the drawings) protrude through the center of the tray bottom from above and lock into place under the longitudinal wires 2 with transversal (or, transverse) supports attached to the lower end of the brackets. Such a symmetrical suspension of the trays has the advantage over the widely used placement of the trays on tray holders extending from brackets (ceiling supports) mounted alongside the trays, that the latter type of installation inevitably results in asymmetrical loads and the supporting material must therefore be much stronger.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist carries out the recited function, whether or not precisely equivalent to the embodiment or embodiments disclosed in the specification above; and it is intended that such expressions be given their broadest interpretation.

What is claimed is:

1. A cable and electrical conductor tray (10) extending longitudinally, the tray comprising a substantially completely open-ended wire trellis, the trellis including transverse cross wires (1) and substantially straight longitudinal wires (2) connecting the cross wires, the cross wires and the longitudinal wires having a total thickness;

the cross wires being essentially U-shaped and including side legs (3); wherein the side legs are crimped toward an outside of the U-shape by an amount (a) at least equal to the total thickness of the crossed longitudinal wires and cross wires, such that the tray is widened, in transverse cross section, in an upper partial area thereof; whereby a plurality of the trays is stackable with an upper tray (10') of the plurality fitting inside a lower tray (10) of the plurality when the lower tray and the upper tray are longitudinally offset.

2. The tray according to claim 1, wherein the upper partial area has a height at least half a total height of the tray.

3. The tray according to claim 1, wherein:

the longitudinal wires comprise a pair of upper longitudinal wires (2a) connecting upper ends of the cross wires along two longitudinal sides of the tray, and a pair of intermediate longitudinal wires (2b') being located above a crimp point at which the side legs are crimped; whereby when the upper tray and the lower tray are stacked the upper longitudinal wires (2a) of the lower tray support the intermediate longitudinal wires (2b') of the upper tray.

4. The tray according to claim 1, wherein there are no longitudinal wires within a longitudinal center area (7) of the tray.

5. A cable and electrical conductor tray (10) of substantially completely open ended crossed-wire mesh trellis construction including crossed longitudinal wires (2) and cross wires (1);

the tray having a longitudinal extension, a width, a height, and a total thickness substantially equal to a longitudinal wire diameters and a cross wire diameter;

the tray being substantially U-shaped in transverse cross section and including a bottom and two sides;

the two sides of the tray each including an outward crimp at a crimp height above the bottom;

the longitudinal wires being substantially straight and including on each of the two sides respectively an upper longitudinal wire (2a) connecting upper ends of the cross wires and an intermediate longitudinal wire (2b') disposed a distance below the upper longitudinal wire (2a), where the distance is less than the crimp height; whereby when the upper tray and the lower tray are stacked the upper longitudinal wires (2a) of the lower tray support the intermediate longitudinal wires (2b') of the upper tray.

6. The tray according to claim 5, wherein the crimp laterally offsets an upper portion of the side by at least substantially the total thickness.

7. The tray according to claim 5, wherein the transverse cross section is substantially constant along a length of the tray.

8. The tray according to claim 1, wherein the transverse cross section is substantially constant along a length of the tray.

* * * * *